(12) United States Patent
Bergey et al.

(10) Patent No.: US 10,324,206 B2
(45) Date of Patent: Jun. 18, 2019

(54) METHOD OF MODELLING A SUBSURFACE VOLUME

(71) Applicant: Total S.A., Paris (FR)

(72) Inventors: Pierre Bergey, Saint-Germain-en-Laye (FR); Anahita Abadpour, Pau (FR)

(73) Assignee: Total S.A., Courbevoie (FR)

(*) Notice: Subject to any disclaimer, the term of this patent is extended or adjusted under 35 U.S.C. 154(b) by 620 days.

(21) Appl. No.: 14/767,492

(22) PCT Filed: Feb. 7, 2014

(86) PCT No.: PCT/EP2014/052496
§ 371 (c)(1),
(2) Date: Aug. 12, 2015

(87) PCT Pub. No.: WO2014/124885
PCT Pub. Date: Aug. 21, 2014

(65) Prior Publication Data
US 2015/0369937 A1    Dec. 24, 2015

(30) Foreign Application Priority Data
Feb. 15, 2013 (GB) .................................. 1302712.3

(51) Int. Cl.
*G01V 1/30* (2006.01)
*G01V 1/28* (2006.01)
*G01V 1/40* (2006.01)

(52) U.S. Cl.
CPC .............. *G01V 1/306* (2013.01); *G01V 1/282* (2013.01); *G01V 1/308* (2013.01); *G01V 1/40* (2013.01)

(58) Field of Classification Search
CPC ........ G01V 1/306; G01V 1/282; G01V 1/308; G01V 1/40
See application file for complete search history.

(56) References Cited

U.S. PATENT DOCUMENTS

2008/0077371 A1    3/2008  Yeten et al.
2010/0057413 A1    3/2010  Lee et al.
(Continued)

FOREIGN PATENT DOCUMENTS

| EP | 2447467 A1 | 5/2012 |
|---|---|---|
| WO | WO-2008/028122 A2 | 3/2008 |
| WO | WO-2014124884 A1 | 8/2014 |

OTHER PUBLICATIONS

Parmentier, Hélène, "International Search Report," prepared for PCT/EP2014/052496, dated Jun. 30, 2014, four pages.
(Continued)

*Primary Examiner* — Peter Bradford
(74) *Attorney, Agent, or Firm* — Winstead PC (57) ABSTRACT

Disclosed is a method monitoring changes in saturation of a subsurface volume. The method comprises: obtaining observed data of saturation behavior from the subsurface volume over time; using one or more models, obtaining simulated data of saturation behavior from the subsurface volume over time; and transforming each of the observed data and simulated data. The transformation is done such that in each case the data is described in terms of: a front location parameter, wherein a cell of the subsurface volume is attributed a value according to its location relative to a front of the fluid for which saturation is being monitored, and a sweep intensity parameter, wherein a cell of the subsurface volume is attributed a value according to either the observed saturation variation over a time period, or an estimated saturation variation over the time period, finally, a mismatch between saturation behavior in said transformed observed data and saturation behavior in said transformed simulated data over said time period is calculated.

22 Claims, 8 Drawing Sheets

(56) References Cited

U.S. PATENT DOCUMENTS

| | | |
|---|---|---|
| 2010/0185422 A1 | 7/2010 | Hoversten |
| 2010/0254217 A1* | 10/2010 | Chu .................. G01V 1/30 367/38 |
| 2011/0131015 A1 | 6/2011 | Yarus et al. |
| 2011/0137565 A1 | 6/2011 | Perlmutter et al. |
| 2011/0194379 A1 | 8/2011 | Lee et al. |
| 2011/0205844 A1 | 8/2011 | Maucec et al. |
| 2011/0273959 A1 | 11/2011 | Jin et al. |
| 2011/0276320 A1 | 11/2011 | Krebs et al. |
| 2011/0295510 A1 | 12/2011 | Gulati |
| 2012/0014218 A1* | 1/2012 | Houck .................. G01V 1/28 367/72 |
| 2012/0084043 A1 | 4/2012 | Courtade et al. |
| 2012/0109597 A1 | 5/2012 | Derfoul et al. |
| 2012/0143506 A1 | 6/2012 | Routh et al. |
| 2013/0028052 A1 | 1/2013 | Routh et al. |
| 2013/0250726 A1* | 9/2013 | Frydman ............... G01V 1/308 367/73 |

OTHER PUBLICATIONS

Abadpour, Anahita, et al., "4D Seismic History Matching with Ensemble Kalman Filter—Assimilation on Hausdorff Distance to Saturation Front," SPE Reservoir Simulation Symposium, Feb. 18, 2013, pp. 1-8.

Trani, M., et al., "Seismic History Matching of Fluid Fronts Using the Ensemble Kalman Filter," SPE Journal, Feb. 1, 2013, pp. 159-171.

Jouini, Mohamed Soufiane, et al.; "Simulation of Elastic Properties in Carbonates"; The Leading Edge; Dec. 2011; pp. 1400-1407.

U.S. Appl. No. 14/767,450, Abadpour et al.

\* cited by examiner

Saturation at t0

Water

| 10% | 13% | 9% | 8% | 15% | 9% | 7% | 14% | 12% | 12% | 11% |
|---|---|---|---|---|---|---|---|---|---|---|
| 13% | 7% | 9% | 12% | 11% | 9% | 10% | 13% | 14% | 15% | 8% |
| 15% | 6% | 14% | 8% | 15% | 15% | 13% | 8% | 9% | 11% | 9% |
| 11% | 9% | 10% | 9% | 11% | 14% | 15% | 12% | 10% | 7% | 7% |
| 12% | 5% | 15% | 7% | 9% | 9% | 13% | 6% | 6% | 8% | 11% |
| 6% | 5% | 13% | 8% | 10% | 5% | 6% | 14% | 12% | 11% | 7% |
| 6% | 13% | 12% | 14% | 8% | 13% | 8% | 11% | 13% | 9% | 8% |
| 100% | 9% | 14% | 6% | 10% | 13% | 9% | 8% | 14% | 12% | 11% |
| 100% | 100% | 7% | 10% | 9% | 8% | 11% | 6% | 11% | 12% | 7% |
| 100% | 100% | 100% | 15% | 10% | 13% | 11% | 5% | 11% | 6% | 11% |
| 100% | 100% | 100% | 100% | 100% | 100% | 100% | 100% | 100% | 100% | 100% |

Oil

| 90% | 87% | 91% | 92% | 85% | 91% | 93% | 0% | 0% | 0% | 0% |
|---|---|---|---|---|---|---|---|---|---|---|
| 87% | 93% | 91% | 88% | 89% | 91% | 90% | 87% | 0% | 0% | 0% |
| 85% | 94% | 86% | 92% | 85% | 85% | 87% | 92% | 91% | 0% | 0% |
| 89% | 91% | 90% | 91% | 89% | 86% | 85% | 88% | 90% | 93% | 0% |
| 88% | 95% | 85% | 93% | 91% | 91% | 87% | 94% | 94% | 92% | 0% |
| 94% | 95% | 87% | 92% | 90% | 95% | 94% | 86% | 88% | 89% | 0% |
| 94% | 87% | 88% | 86% | 92% | 87% | 92% | 89% | 87% | 91% | 0% |
| 0% | 91% | 86% | 94% | 90% | 87% | 91% | 92% | 86% | 88% | 0% |
| 0% | 0% | 93% | 90% | 91% | 92% | 89% | 94% | 89% | 88% | 0% |
| 0% | 0% | 0% | 85% | 90% | 87% | 89% | 95% | 89% | 94% | 0% |
| 0% | 0% | 0% | 0% | 0% | 0% | 0% | 0% | 0% | 0% | 0% |

Fig. 3a

Gas

| 0% | 0% | 0% | 0% | 0% | 0% | 0% | 86% | 88% | 88% | 89% |
|---|---|---|---|---|---|---|---|---|---|---|
| 0% | 0% | 0% | 0% | 0% | 0% | 0% | 0% | 86% | 85% | 92% |
| 0% | 0% | 0% | 0% | 0% | 0% | 0% | 0% | 0% | 89% | 91% |
| 0% | 0% | 0% | 0% | 0% | 0% | 0% | 0% | 0% | 0% | 93% |
| 0% | 0% | 0% | 0% | 0% | 0% | 0% | 0% | 0% | 0% | 89% |
| 0% | 0% | 0% | 0% | 0% | 0% | 0% | 0% | 0% | 0% | 93% |
| 0% | 0% | 0% | 0% | 0% | 0% | 0% | 0% | 0% | 0% | 92% |
| 0% | 0% | 0% | 0% | 0% | 0% | 0% | 0% | 0% | 0% | 89% |
| 0% | 0% | 0% | 0% | 0% | 0% | 0% | 0% | 0% | 0% | 93% |
| 0% | 0% | 0% | 0% | 0% | 0% | 0% | 0% | 0% | 0% | 89% |
| 0% | 0% | 0% | 0% | 0% | 0% | 0% | 0% | 0% | 0% | 0% |

Saturation at t1

Water:

| 10% | 13% | 9% | 8% | 15% | 9% | 7% | 14% | 12% | 12% | 11% |
|---|---|---|---|---|---|---|---|---|---|---|
| 13% | 7% | 9% | 12% | 11% | 9% | 10% | 13% | 14% | 15% | 8% |
| 15% | 6% | 14% | 8% | 15% | 15% | 13% | 8% | 9% | 11% | 9% |
| 11% | 9% | 10% | 9% | 11% | 14% | 15% | 12% | 10% | 7% | 7% |
| 12% | 5% | 15% | 7% | 9% | 9% | 13% | 6% | 6% | 8% | 11% |
| 6% | 5% | 13% | 8% | 10% | 5% | 6% | 14% | 12% | 11% | 7% |
| 63% | 62% | 12% | 14% | 8% | 13% | 8% | 11% | 13% | 9% | 8% |
| 100% | 62% | 62% | 6% | 10% | 13% | 9% | 8% | 14% | 12% | 11% |
| 100% | 100% | 65% | 65% | 9% | 8% | 11% | 6% | 11% | 12% | 7% |
| 100% | 100% | 100% | 55% | 63% | 13% | 11% | 5% | 11% | 6% | 11% |
| 100% | 100% | 100% | 100% | 53% | 40% | 30% | 20% | 11% | 7% | 7% |

Oil:

| 90% | 87% | 91% | 92% | 85% | 91% | 18% | 0% | 0% | 0% | 0% |
|---|---|---|---|---|---|---|---|---|---|---|
| 87% | 93% | 91% | 88% | 89% | 91% | 20% | 18% | 0% | 0% | 0% |
| 85% | 94% | 86% | 92% | 85% | 85% | 87% | 20% | 17% | 0% | 0% |
| 89% | 91% | 90% | 91% | 89% | 86% | 85% | 88% | 19% | 25% | 0% |
| 88% | 95% | 85% | 93% | 91% | 91% | 87% | 94% | 94% | 75% | 30% |
| 94% | 95% | 87% | 92% | 90% | 95% | 94% | 86% | 88% | 89% | 43% |
| 37% | 38% | 88% | 86% | 92% | 87% | 92% | 89% | 87% | 91% | 62% |
| 0% | 38% | 38% | 94% | 90% | 87% | 91% | 92% | 86% | 88% | 89% |
| 0% | 0% | 35% | 35% | 91% | 92% | 89% | 94% | 89% | 88% | 93% |
| 0% | 0% | 0% | 45% | 37% | 87% | 89% | 95% | 89% | 94% | 89% |
| 0% | 0% | 0% | 0% | 47% | 60% | 70% | 80% | 89% | 93% | 93% |

Fig. 3b

Gas:

| 0% | 0% | 0% | 0% | 0% | 0% | 75% | 86% | 88% | 88% | 89% |
|---|---|---|---|---|---|---|---|---|---|---|
| 0% | 0% | 0% | 0% | 0% | 0% | 70% | 69% | 86% | 85% | 92% |
| 0% | 0% | 0% | 0% | 0% | 0% | 0% | 72% | 74% | 89% | 91% |
| 0% | 0% | 0% | 0% | 0% | 0% | 0% | 0% | 71% | 68% | 93% |
| 0% | 0% | 0% | 0% | 0% | 0% | 0% | 0% | 0% | 0% | 75% |
| 0% | 0% | 0% | 0% | 0% | 0% | 0% | 0% | 0% | 0% | 50% |
| 0% | 0% | 0% | 0% | 0% | 0% | 0% | 0% | 0% | 0% | 30% |
| 0% | 0% | 0% | 0% | 0% | 0% | 0% | 0% | 0% | 0% | 0% |
| 0% | 0% | 0% | 0% | 0% | 0% | 0% | 0% | 0% | 0% | 0% |
| 0% | 0% | 0% | 0% | 0% | 0% | 0% | 0% | 0% | 0% | 0% |
| 0% | 0% | 0% | 0% | 0% | 0% | 0% | 0% | 0% | 0% | 0% |

Saturation variation t1-t0

Water:

| | | | | | | | | | |
|---|---|---|---|---|---|---|---|---|---|
| 0% | 0% | 0% | 0% | 0% | 0% | 0% | 0% | 0% | 0% |
| 0% | 0% | 0% | 0% | 0% | 0% | 0% | 0% | 0% | 0% |
| 0% | 0% | 0% | 0% | 0% | 0% | 0% | 0% | 0% | 0% |
| 0% | 0% | 0% | 0% | 0% | 0% | 0% | 0% | 0% | 0% |
| 0% | 0% | 0% | 0% | 0% | 0% | 0% | 0% | 0% | 0% |
| 0% | 0% | 0% | 0% | 0% | 0% | 0% | 0% | 0% | 0% |
| 57% | 49% | 0% | 0% | 0% | 0% | 0% | 0% | 0% | 0% |
| 0% | 53% | 48% | 0% | 0% | 0% | 0% | 0% | 0% | 0% |
| 0% | 0% | 58% | 55% | 0% | 0% | 0% | 0% | 0% | 0% |
| 0% | 0% | 0% | 40% | 53% | 0% | 0% | 0% | 0% | 0% |
| 0% | 0% | 0% | 0% | -47% | -60% | -70% | -80% | -89% | -93% | -93% |

Oil:

| | | | | | | | | | |
|---|---|---|---|---|---|---|---|---|---|
| 0% | 0% | 0% | 0% | 0% | 0% | -75% | 0% | 0% | 0% |
| 0% | 0% | 0% | 0% | 0% | 0% | -70% | -69% | 0% | 0% |
| 0% | 0% | 0% | 0% | 0% | 0% | 0% | -72% | -74% | 0% |
| 0% | 0% | 0% | 0% | 0% | 0% | 0% | 0% | -71% | -68% | 0% |
| 0% | 0% | 0% | 0% | 0% | 0% | 0% | 0% | -17% | 30% |
| 0% | 0% | 0% | 0% | 0% | 0% | 0% | 0% | 0% | 43% |
| -57% | -49% | 0% | 0% | 0% | 0% | 0% | 0% | 0% | 62% |
| 0% | -53% | -48% | 0% | 0% | 0% | 0% | 0% | 0% | 89% |
| 0% | 0% | -58% | -55% | 0% | 0% | 0% | 0% | 0% | 93% |
| 0% | 0% | 0% | -40% | -53% | 0% | 0% | 0% | 0% | 89% |
| 0% | 0% | 0% | 0% | 47% | 60% | 70% | 80% | 89% | 93% | 93% |

Fig. 3c

Gas:

| | | | | | | | | | |
|---|---|---|---|---|---|---|---|---|---|
| 0% | 0% | 0% | 0% | 0% | 0% | 75% | 0% | 0% | 0% |
| 0% | 0% | 0% | 0% | 0% | 0% | 70% | 69% | 0% | 0% |
| 0% | 0% | 0% | 0% | 0% | 0% | 0% | 72% | 74% | 0% |
| 0% | 0% | 0% | 0% | 0% | 0% | 0% | 0% | 71% | 68% | 0% |
| 0% | 0% | 0% | 0% | 0% | 0% | 0% | 0% | 0% | -14% |
| 0% | 0% | 0% | 0% | 0% | 0% | 0% | 0% | 0% | -43% |
| 0% | 0% | 0% | 0% | 0% | 0% | 0% | 0% | 0% | -62% |
| 0% | 0% | 0% | 0% | 0% | 0% | 0% | 0% | 0% | -89% |
| 0% | 0% | 0% | 0% | 0% | 0% | 0% | 0% | 0% | -93% |
| 0% | 0% | 0% | 0% | 0% | 0% | 0% | 0% | 0% | -89% |
| 0% | 0% | 0% | 0% | 0% | 0% | 0% | 0% | 0% | 0% |

| 0 | 0 | 0 | 0 | 0 | 0 | 0 | 2 | 2 | 2 | 2 |
|---|---|---|---|---|---|---|---|---|---|---|
| 0 | 0 | 0 | 0 | 0 | 0 | 0 | 0 | 2 | 2 | 2 |
| 0 | 0 | 0 | 0 | 0 | 0 | 0 | 0 | 0 | 2 | 2 |
| 0 | 0 | 0 | 0 | 0 | 0 | 0 | 0 | 0 | 0 | 2 |
| 0 | 0 | 0 | 0 | 0 | 0 | 0 | 0 | 0 | 0 | 2 |
| 0 | 0 | 0 | 0 | 0 | 0 | 0 | 0 | 0 | 0 | 2 |
| 0 | 0 | 0 | 0 | 0 | 0 | 0 | 0 | 0 | 0 | 2 |
| 1 | 0 | 0 | 0 | 0 | 0 | 0 | 0 | 0 | 0 | 2 |
| 1 | 1 | 0 | 0 | 0 | 0 | 0 | 0 | 0 | 0 | 2 |
| 1 | 1 | 1 | 0 | 0 | 0 | 0 | 0 | 0 | 0 | 2 |
| 1 | 1 | 1 | 1 | 1 | 1 | 1 | 1 | 1 | 1 | 1 |

| 0 | Oil | | 1 | Water | | 2 | Gas |

Fig. 3d

Front Location at t1

Water

| | | | | | | | | | | |
|---|---|---|---|---|---|---|---|---|---|---|
| 0% | 0% | 0% | 0% | 0% | 0% | 0% | 0% | 0% | 0% | 0% |
| 0% | 0% | 0% | 0% | 0% | 0% | 0% | 0% | 0% | 0% | 0% |
| 0% | 0% | 0% | 0% | 0% | 0% | 0% | 0% | 0% | 0% | 0% |
| 0% | 0% | 0% | 0% | 0% | 0% | 0% | 0% | 0% | 0% | 0% |
| 0% | 0% | 0% | 0% | 0% | 0% | 0% | 0% | 0% | 0% | 0% |
| 0% | 0% | 0% | 0% | 0% | 0% | 0% | 0% | 0% | 0% | 0% |
| 100% | 100% | 0% | 0% | 0% | 0% | 0% | 0% | 0% | 0% | 0% |
| 100% | 100% | 100% | 0% | 0% | 0% | 0% | 0% | 0% | 0% | 0% |
| 100% | 100% | 100% | 100% | 0% | 0% | 0% | 0% | 0% | 0% | 0% |
| 100% | 100% | 100% | 100% | 100% | 0% | 0% | 0% | 0% | 0% | 0% |
| 100% | 100% | 100% | 100% | 100% | 100% | 100% | 100% | 100% | 100% | 100% |

Oil

| | | | | | | | | | | |
|---|---|---|---|---|---|---|---|---|---|---|
| 100% | 100% | 100% | 100% | 100% | 100% | 100% | 0% | 0% | 0% | 0% |
| 100% | 100% | 100% | 100% | 100% | 100% | 100% | 100% | 0% | 0% | 0% |
| 100% | 100% | 100% | 100% | 100% | 100% | 100% | 100% | 100% | 0% | 0% |
| 100% | 100% | 100% | 100% | 100% | 100% | 100% | 100% | 100% | 100% | 0% |
| 100% | 100% | 100% | 100% | 100% | 100% | 100% | 100% | 100% | 100% | 0% |
| 100% | 100% | 100% | 100% | 100% | 100% | 100% | 100% | 100% | 100% | 100% |
| 100% | 100% | 100% | 100% | 100% | 100% | 100% | 100% | 100% | 100% | 100% |
| 0% | 100% | 100% | 100% | 100% | 100% | 100% | 100% | 100% | 100% | 100% |
| 0% | 0% | 100% | 100% | 100% | 100% | 100% | 100% | 100% | 100% | 100% |
| 0% | 0% | 0% | 100% | 100% | 100% | 100% | 100% | 100% | 100% | 100% |
| 0% | 0% | 0% | 0% | 100% | 100% | 100% | 100% | 100% | 100% | 100% |

Fig. 3e

Gas

| | | | | | | | | | | |
|---|---|---|---|---|---|---|---|---|---|---|
| 0% | 0% | 0% | 0% | 0% | 0% | 100% | 100% | 100% | 100% | 100% |
| 0% | 0% | 0% | 0% | 0% | 0% | 100% | 100% | 100% | 100% | 100% |
| 0% | 0% | 0% | 0% | 0% | 0% | 0% | 100% | 100% | 100% | 100% |
| 0% | 0% | 0% | 0% | 0% | 0% | 0% | 0% | 100% | 100% | 100% |
| 0% | 0% | 0% | 0% | 0% | 0% | 0% | 0% | 0% | 0% | 100% |
| 0% | 0% | 0% | 0% | 0% | 0% | 0% | 0% | 0% | 0% | 100% |
| 0% | 0% | 0% | 0% | 0% | 0% | 0% | 0% | 0% | 0% | 100% |
| 0% | 0% | 0% | 0% | 0% | 0% | 0% | 0% | 0% | 0% | 100% |
| 0% | 0% | 0% | 0% | 0% | 0% | 0% | 0% | 0% | 0% | 100% |
| 0% | 0% | 0% | 0% | 0% | 0% | 0% | 0% | 0% | 0% | 100% |
| 0% | 0% | 0% | 0% | 0% | 0% | 0% | 0% | 0% | 0% | 0% |

Sweep Intensity at t1

Water:

| 52% | 52% | 52% | 52% | 52% | 52% | 52% | 52% | 52% | 52% | 52% |
|---|---|---|---|---|---|---|---|---|---|---|
| 52% | 52% | 52% | 52% | 52% | 52% | 52% | 52% | 52% | 52% | 52% |
| 52% | 52% | 52% | 52% | 52% | 52% | 52% | 52% | 52% | 52% | 52% |
| 52% | 52% | 52% | 52% | 52% | 52% | 52% | 52% | 52% | 52% | 52% |
| 52% | 52% | 52% | 52% | 52% | 52% | 52% | 52% | 52% | 52% | 52% |
| 52% | 52% | 52% | 52% | 52% | 52% | 52% | 52% | 52% | 52% | 52% |
| 57% | 49% | 52% | 52% | 52% | 52% | 52% | 52% | 52% | 52% | 52% |
| 52% | 53% | 48% | 52% | 52% | 52% | 52% | 52% | 52% | 52% | 52% |
| 52% | 52% | 58% | 55% | 52% | 52% | 52% | 52% | 52% | 52% | 52% |
| 52% | 52% | 52% | 40% | 53% | 52% | 52% | 52% | 52% | 52% | 52% |
| 52% | 52% | 52% | 52% | 52% | 52% | 52% | 52% | 52% | 52% | 52% |

Oil:

| 76% | 76% | 76% | 76% | 76% | 76% | 76% | 76% | 76% | 76% | 76% |
|---|---|---|---|---|---|---|---|---|---|---|
| 76% | 76% | 76% | 76% | 76% | 76% | 76% | 76% | 76% | 76% | 76% |
| 76% | 76% | 76% | 76% | 76% | 76% | 76% | 76% | 76% | 76% | 76% |
| 76% | 76% | 76% | 76% | 76% | 76% | 76% | 76% | 76% | 76% | 76% |
| 76% | 76% | 76% | 76% | 76% | 76% | 76% | 76% | 76% | 76% | 76% |
| 76% | 76% | 76% | 76% | 76% | 76% | 76% | 76% | 76% | 76% | 76% |
| 76% | 76% | 76% | 76% | 76% | 76% | 76% | 76% | 76% | 76% | 43% |
| 76% | 76% | 76% | 76% | 76% | 76% | 76% | 76% | 76% | 76% | 62% |
| 76% | 76% | 76% | 76% | 76% | 76% | 76% | 76% | 76% | 76% | 89% |
| 76% | 76% | 76% | 76% | 76% | 76% | 76% | 76% | 76% | 76% | 93% |
| 76% | 76% | 76% | 76% | 76% | 76% | 76% | 76% | 76% | 76% | 89% |
| 76% | 76% | 76% | 76% | 47% | 60% | 70% | 80% | 89% | 93% | 93% |

Fig. 3f

Gas:

| 71% | 71% | 71% | 71% | 71% | 71% | 75% | 71% | 71% | 71% | 71% |
|---|---|---|---|---|---|---|---|---|---|---|
| 71% | 71% | 71% | 71% | 71% | 71% | 70% | 69% | 71% | 71% | 71% |
| 71% | 71% | 71% | 71% | 71% | 71% | 71% | 72% | 74% | 71% | 71% |
| 71% | 71% | 71% | 71% | 71% | 71% | 71% | 71% | 71% | 68% | 71% |
| 71% | 71% | 71% | 71% | 71% | 71% | 71% | 71% | 71% | 71% | 71% |
| 71% | 71% | 71% | 71% | 71% | 71% | 71% | 71% | 71% | 71% | 71% |
| 71% | 71% | 71% | 71% | 71% | 71% | 71% | 71% | 71% | 71% | 71% |
| 71% | 71% | 71% | 71% | 71% | 71% | 71% | 71% | 71% | 71% | 71% |
| 71% | 71% | 71% | 71% | 71% | 71% | 71% | 71% | 71% | 71% | 71% |
| 71% | 71% | 71% | 71% | 71% | 71% | 71% | 71% | 71% | 71% | 71% |
| 71% | 71% | 71% | 71% | 71% | 71% | 71% | 71% | 71% | 71% | 71% |

METHOD OF MODELLING A SUBSURFACE VOLUME

The present disclosure relates to methods of subsurface modelling and in particular to such methods for modelling the behaviour of a subsurface hydrocarbon reservoir using history matching techniques.

Subsurface Models

Subsurface models may comprise, for example, reservoir flow, basin, and geo-mechanical models. These comprise gridded 3D representations of the subsurface used as inputs to a simulator allowing the prediction of a range of physical properties as a function of controlled or un-controlled boundary conditions.

One type of subsurface model is the reservoir flow model. This aims to predict fluid flow properties, primarily multi-phase rates (and composition), pressure and temperature, under oil and gas field or aquifer development scenarios.

Reservoir model assisted history match is a class of inversion processes. Inversion processes typically involve using solver algorithms along various observation and model input parameterization schemes.

Solver algorithms are used to minimize an objective function measuring the difference between real and simulated observations. Simulated observations are obtained by simulating historic reservoir production conditions using a flow simulator and a 3D reservoir model as input.

A number of different methods are used as solvers in history matching 3D reservoir models. Among those are Genetic Algorithm, Evolution strategy, Gradients, Covariance Matrix Adaptation-Evolution Strategy and Ensemble methods (such as Ensemble Kalman Filter or Ensemble Smoothers).

Parameterization schemes are used to transform reservoir models or observations in ways that make the convergence process faster and/or to provide a more realistic output reservoir model or to minimize changes from the input model(s). The efficiency of the overall process is a function of the solver and the parameterization methods and their interactions.

Saturation is a direct measure of the fluid content of the porous rock comprised within a reservoir. Saturation variation "observations" are derived from repeated geophysical surveys, such as reflection or refraction seismic surveys, by means of a specific inversion processes. Such processes are used to derive, from the difference between similar geophysical surveys at various times over the production period, the changes of fluid saturation that occurred from reference dates till specific repeat survey dates.

Objective functions used in history matching 3D observations of saturation changes typically rely upon the measure of the difference between observed saturation or change of saturation over time between a simulated model answer and a true observation, either on a cell by cell or average basis; over all or part of the 3D domain.

It would be desirable to improve the accuracy and/or efficiency of history matching using changes in saturation over time.

SUMMARY OF INVENTION

In a first aspect of the invention there is provided a method of monitoring changes in saturation of a subsurface volume, said method comprising:
obtaining observed data of saturation behaviour from said subsurface volume over time;
using one or more models, obtaining simulated data of saturation behaviour from said subsurface volume over time;
transforming each of said observed data and said simulated data such that in each case the data is described in terms of:
a front location parameter, wherein a cell of the subsurface volume is attributed a value according to its location relative to a front of the fluid for which saturation is being monitored, and
a sweep intensity parameter, wherein a cell of the subsurface volume is attributed a value according to either the observed saturation variation over a time period, or an estimated saturation variation over the time period; and
calculating a mismatch between saturation behaviour in said transformed observed data and saturation behaviour in said transformed simulated data over said time period.

Other aspects of the invention comprise a computer program comprising computer readable instructions which, when run on suitable computer apparatus, cause the computer apparatus to perform the method of the first aspect; and an apparatus specifically adapted to carry out all the steps of any of the method of the first aspect.

Other non-essential features of the invention are as claimed in the appended dependent claims.

BRIEF DESCRIPTION OF THE DRAWINGS

Embodiments of the invention will now be described, by way of example only, by reference to the accompanying drawings, in which:

FIGS. 3*a* to 3*f* show example data at different stages of the method illustrated in FIG. 2.

DETAILED DESCRIPTION OF THE EMBODIMENTS

History matching is an inversion process wherein initial input data (a realization) is modified so that the simulated (or predicted) dynamic responses are a better match with the measured ones. It comprises determining the input data, considering a given forward modelling process and set of constraints, which results in a simulation output that best corresponds to observed data (over the same timeframe) similar in nature to the simulation output. In this way input assumptions can be improved when modelling future behaviour.

Assisted History Match (AHM) is any method automating such process. Assisted History Match methods usually rely upon an iterative process of minimization of a cost (objective) function.

In the context of AHM, parameterisation methods are methods in which part of the input data or the observations are transformed in such a way that the iterative optimization process is made more efficient (for example requiring fewer iterations to solve, resulting in better fit to observation and/or less modification to the input data). A parameterisation method, in an iterative inversion scheme, may comprise a set of two functions to transform data back and forth between the simulation input parameter space and the iterative optimization parameter space.

The disclosed method allows the transformation of the saturation change observation data into data types that are more efficiently handled by solvers. The method is particularly efficient in the context of inversion using solver methods relying upon an input made of several model realizations; particularly statistical methods such as Ensemble Kalman Filter (EnKF), Ensemble Smoother (ES), Covariance Matrix Adaptation, Evolution Strategy, etc.

Ensemble Kalman filter and Ensemble Smoother are methods where an ensemble of model realizations is used to provide the relationship between the observation being inverted for and the uncertain parameters being optimized. In a class of these methods (including EnKF and ES) a Kalman filter is applied to update the uncertain parameters while assimilation is done sequentially (EnKF) or in one go (ES) over the measurements. These methods are particularly sensitive to the Gaussian character of the input data, and to how close to linearity the relationship is between input parameters and observations. They accept only continuous parameters as input.

Ensemble Kalman Filter techniques involve starting with an ensemble of initial realizations. Each realization may describe one or more parameters (such as saturation, permeability, porosity etc.) over a volume of a reservoir, which may be divided into cells. Initially, the parameters of only a small number of cells will be known with any degree of certainty (those which have been actually measured) and assumed values are used for the parameters in remainder of the cells. Prior to the first iteration, these assumed values may be random or semi-random seed values.

A simulation output is computed for each of these realizations, for a given time interval. The covariance between observation and input parameters in the Kalman filter is then computed. The resultant correlation data is combined with the mismatch in the observed data measured after the same time interval, to produce an ensemble of updated realizations which should be in greater conformity with the measured data. These updated realizations would then be used as the input of a further simulation.

The disclosed method relates to a specific parameterisation (data transformation) scheme applicable to observations of oil, water and gas (or other fluid) saturation variations when initial contact data is available. This parameterisation scheme is particularly efficient when using solver methods relying upon input made of several model realizations, particularly statistical methods such as Ensemble Kalman Filter or Ensemble Smoother.

Multiphase fluid flow in porous media is a shock front mechanism. The front location and "behind front" saturation are mostly dependent upon different rock characteristics. Front location depends primarily of the compressibility and viscosity of the various fluids, and the permeability, porosity and compressibility of the rock/medium. "behind front" saturation is mostly dependent upon the shape of the relative permeability curves. The method described herein uses these dependencies to express 3D saturation change observations in sets of derived parameters:

A 3D discrete indicator, the front location.
A 3D continuous property, the "behind front" saturation. Such property presents, in most cases, a single mode and a Gaussian distribution.

These derived parameters are:
Fairly independent of one another in most 3D reservoir models,
Fairly linearly related to 3D reservoir model properties,
Presenting fairly mono modal and Gaussian distributions.

Independence between observations; linearity between observation and input parameters; and mono-modal and Gaussian observation distributions are characteristics which increase solver efficiency, particularly for solvers relying upon parallel treatment of multiple model realizations ("statistical" solvers). Methods such as distance to interface parameterisation allow statistical solvers to efficiently handle 3D discrete indicators.

Figure 1:
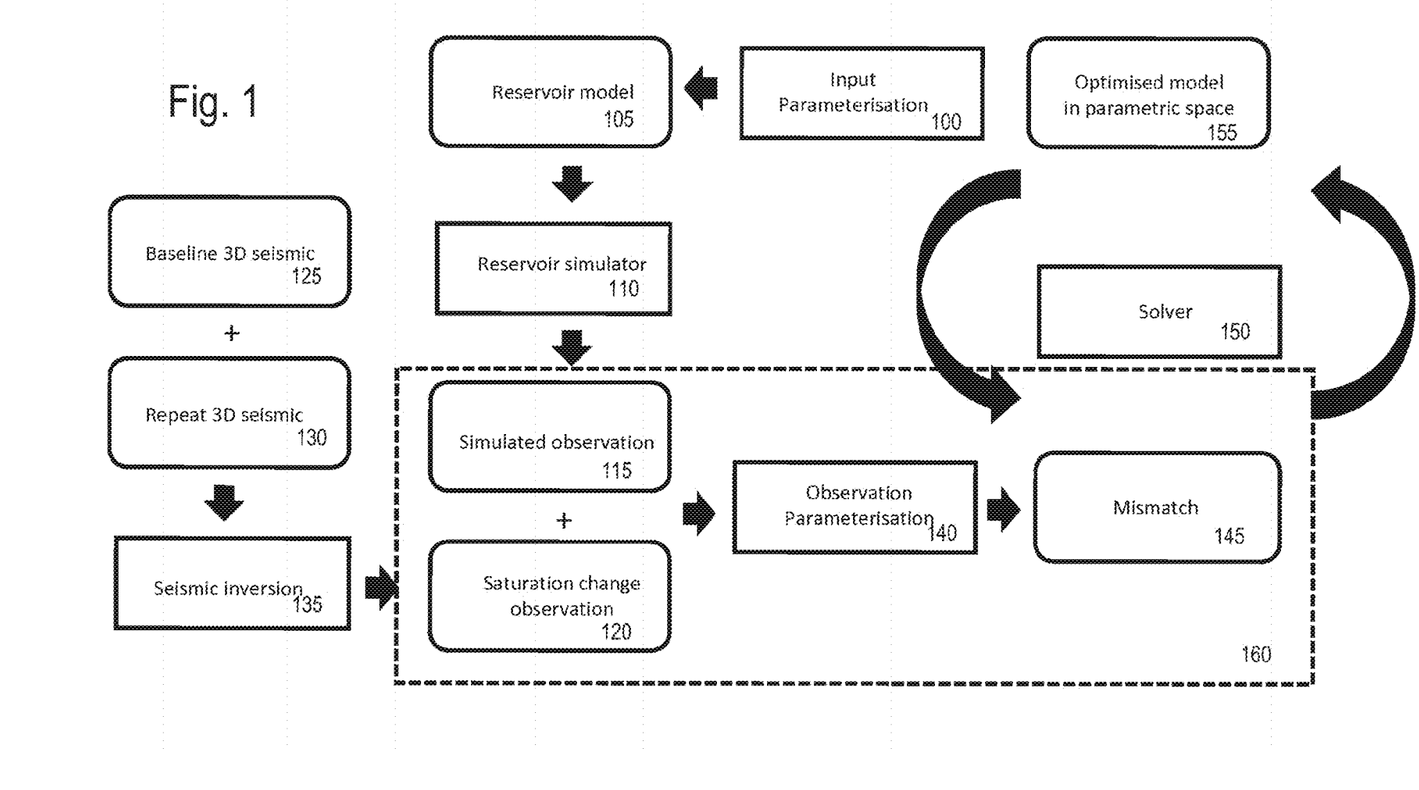
FIG. 1 is a high-level process flowchart illustrating a method in accordance with an embodiment of the invention.

It is proposed not to measure mismatch by direct difference of simulated and observed variations of saturations over time over the 3D model. Instead, the "observed" 3D saturation variation signals for each phase (e.g., oil, water, gas) undergoes a parameterization step (These signals are typically not direct observations but the results of specific inversion processes such as those mentioned above). FIG. 1 is a process flowchart illustrating such a method. Input parameters 100 according to an input parameterization are inputted into a reservoir model 105 and one or more simulations are run 110, so as to obtain simulated saturation change observations 115. Actual saturation change observations 120 are obtained from seismic inversion 135 of a baseline 3D seismic data 125 and later (monitor) 3D seismic data 130. The simulated 115 and actual 120 observations are transformed into an observation parameter space 140, and the mismatch 145 between the simulated 115 and actual 120 observations calculated. This is used by the iterative solver 150 to optimise the model in parametric space 155. The methodology disclosed herein relates to the steps within the dotted box 160.

The parameterization step may comprise transforming the 3D saturation variation signals (using some initial contact/saturation information) into sets of two distinct 3D signals: the front location signal and the sweep intensity signal. The transformation can be operated on a single phase (e.g. transforming water saturation change data into water front location and water sweep efficiency data) or simultaneously on all present phases (typically oil, water and gas) or on any subset thereof (e.g. water and gas, oil and gas, gas and oil).

Front Location Signal

The front location signal is derived from the initial front location and from 3D saturation change data. The front location signal refers to, for each considered cell, its sweep state relative to the considered phase. The sweep state consists of 3D binary indicator data, and can be one of two states: "behind front" or "before front" for each considered phase. A cell is "behind front" at any considered time if either its initial saturation was above an initial saturation threshold (or alternatively if the cell centre depth is above/below relevant initial fluid contact depth) or its saturation change between initial and considered times exceeds a saturation change threshold. Cells that are not initially "behind front", and for which the saturation change is below the saturation change threshold, are deemed "before front" for the considered phase.

The saturation change threshold can be obtained using the Buckley Leverett analytical approach to multi-phase flow in porous media or by analysis of simulation output statistics from 3D models prior to history match (e.g., by identifying a value in between main modes) or any other suitable evaluation method.

Sweep Intensity Signal

The sweep intensity signal is 3D continuous variable data. It is derived as follows:

For cells for which the saturation change exceeds the saturation change threshold (i.e. those labelled "behind front", which were not initially labelled "behind front"), the sweep intensity signal comprises that cell's observed saturation variation for the phase being considered.

For cells for which the saturation change does not exceed the saturation change threshold, the sweep intensity signal comprises the estimated saturation variation expected for the considered phase would the cell be "behind front" for the phase being considered. These cells include the cells that are deemed "before front" as well as those that were initially "behind front". Several approaches are available to compute such expected value. Three possible approaches are explained below by way of example, although any other suitable method can be used within the scope of the invention:

It can be derived from averaging observations across "behind front" cells, not within the initial front location for the phase being considered (globally or per class of cells presenting similar relative permeability characteristics or other flow simulation input properties).

It can be derived from averaging simulated saturation variations across "behind front" cells not within initial front location for the phase being considered (globally or per class of cells presenting similar relative permeability characteristics or other flow simulation input properties).

It can be estimated using an analytical model such as the Buckley Leverett method that allows estimation of "behind front" saturation function of rock and fluid properties (relative permeability, slope, permeability, reservoir thickness, rate, porosity, fluid viscosity). The approach can be used globally or per class of cells presenting similar flow simulation input properties and on an average or statistical basis.

Figure 2:
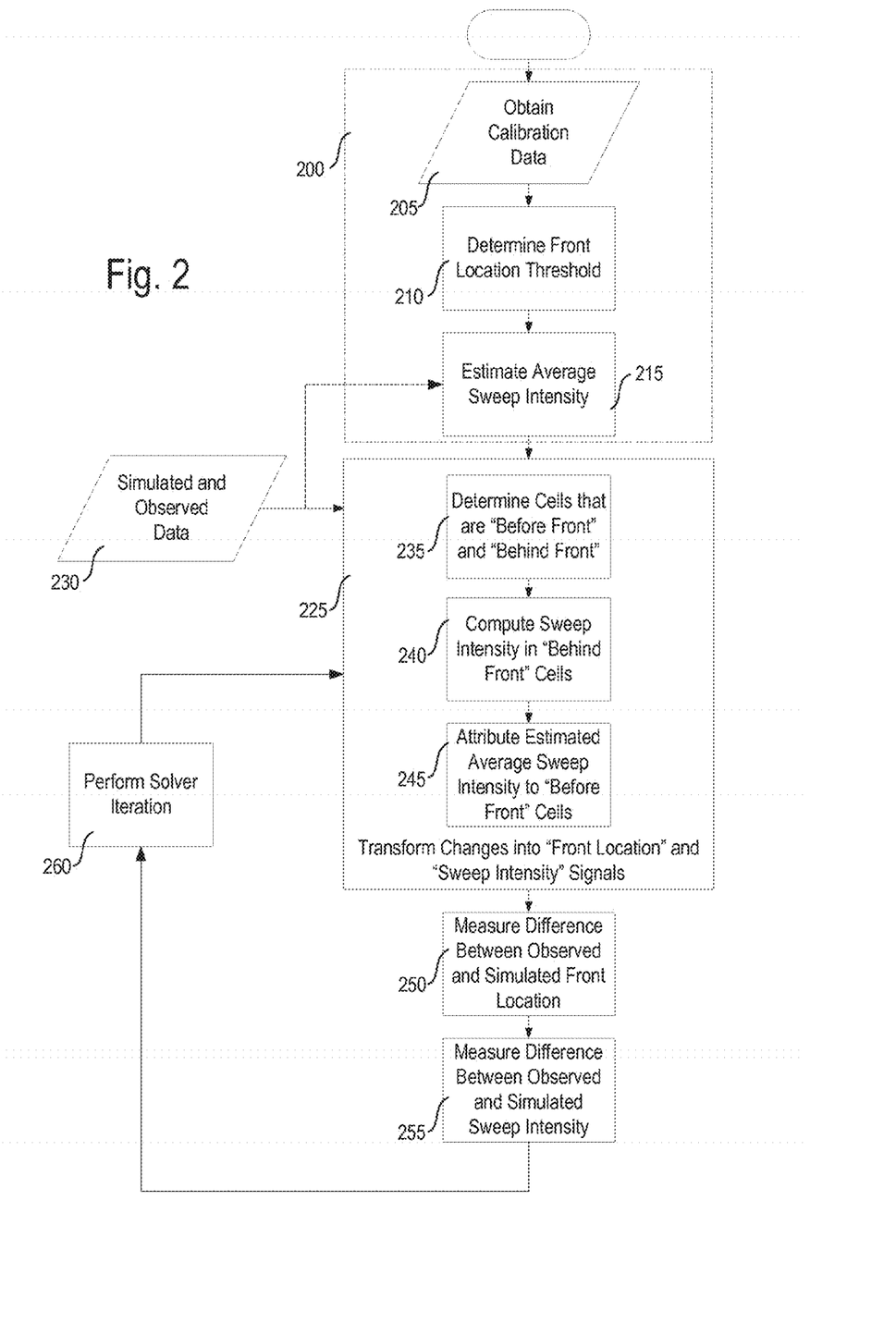
FIG. 2 is a process flowchart illustrating in greater detail the method in accordance with an embodiment of the invention.

FIG. 2 is a process flowchart illustrating a method of transforming the 3D saturation changes into sets of 3D front location signals and 3D sweep intensity signals. The process is applicable for each of the saturation phase variation being handled (oil, water and gas).

Firstly an initial calibration process 200 is performed. This comprises:

a) Obtaining process calibration data (Step 205): this may be achieved by running one or several forward reservoir simulations over the period to be matched.

b) Determining a threshold for the purpose of defining the front location (Step 210): this may comprise analyzing the distribution of saturation changes between saturation survey times per phase over the calibration dataset. For each phase being treated, a saturation change threshold may be selected which clearly separates clusters of cells which are not being invaded by the considered fluid from those cells being invaded by such fluid.

c) Estimating average expected sweep intensity for "before front" cells (Step 215). This may be done globally or per class of cells. A range of methods could be used; for example:

i) Deriving the "behind front" sweep intensity from observations made inside the front.

ii) Deriving the "behind front" sweep intensity from saturation change of the related phase on simulation data over "behind front" cells in each model considered.

iii) Deriving the "behind front" sweep intensity from analytical approximation (e.g. Buckley Leverett) using as an input, average expected values from the model or averaging results of analytical approximation using as an input, a sample of expected values from the model.

Following this, within an inversion loop, at each iteration, the following steps are performed:

d) Transforming 225 the simulated and observed saturation changes 230 into sets of front location and sweep intensity signals. This may be done by performing the following steps:

i) At step 235, defining any cell as "behind front" if it was either originally "behind front", or if it had experienced a saturation change for the considered phase in excess of the thresholds defined at step 210. The front location parameter is a binary indicator regrouping all cells meeting either of these criteria.

ii) At step 240, computing sweep intensity for those cells which experienced a saturation change for the considered phase in excess of the thresholds defined at step 210, by directly attributing each of these cells with the simulated or observed saturation variation of the considered phase for that cell.

iii) At step 245, attributing as sweep intensity for the cells which did not experience a saturation change for the considered phase in excess of the thresholds defined at step 210, the expected saturation change computed at step 215.

e) Measuring the distance between observed and simulated front locations (step 250). This measurement may be performed by measuring a difference between 3D binary indicators on a cell by cell basis, or by more sophisticated (and efficient) techniques such as the measure of distance to interface.

f) Measuring the distance between observed and simulated sweep intensity on a cell by cell basis (step 255).

g) Combining the differences between observed and simulated front locations and the differences between observed and simulated sweep intensities with a relative weight; or forward the mismatch vector (mismatch for all cells or aggregated) directly to the solver. Perform solver iteration (step 260) and repeat the process from step 235.

The distance to interface measure mentioned in relation to step 250 may comprise, for each of the two value classes (e.g. 0 and 1) of each indicator parameter, determining the anisotropic distance to the front; and transforming each indicator parameter into a corresponding continuous parameter using the determined anisotropic distance to the value transition interface. In addition, the determined anisotropic distances to the front may be normalized according to the correlation length. Each of the anisotropic distance and correlation length may be calculated from a variogram for each of the indicators. This methodology is described in greater details in the present applicant's co-pending application of same filing date: GB1302707.3.

In the above method, it should be apparent that the transformation operations 225 can be performed on the observation data only once, and these operations may therefore be performed outside of the overall optimization loop and the results stored appropriately. The above method is presented as such only for convenience and to underline the similarity between treatment of simulated and observed data.

Figure 3A:
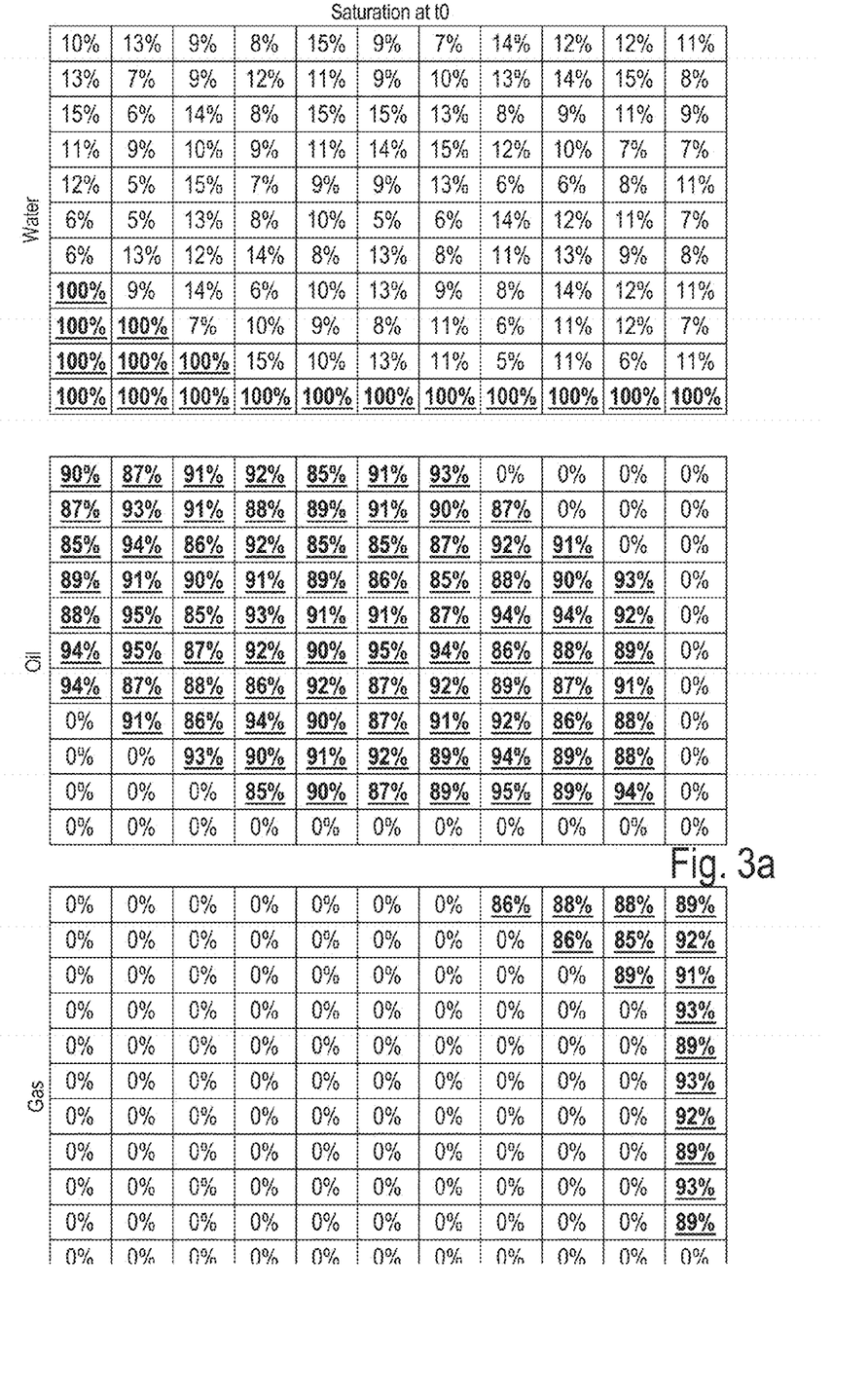
Figure 3B:
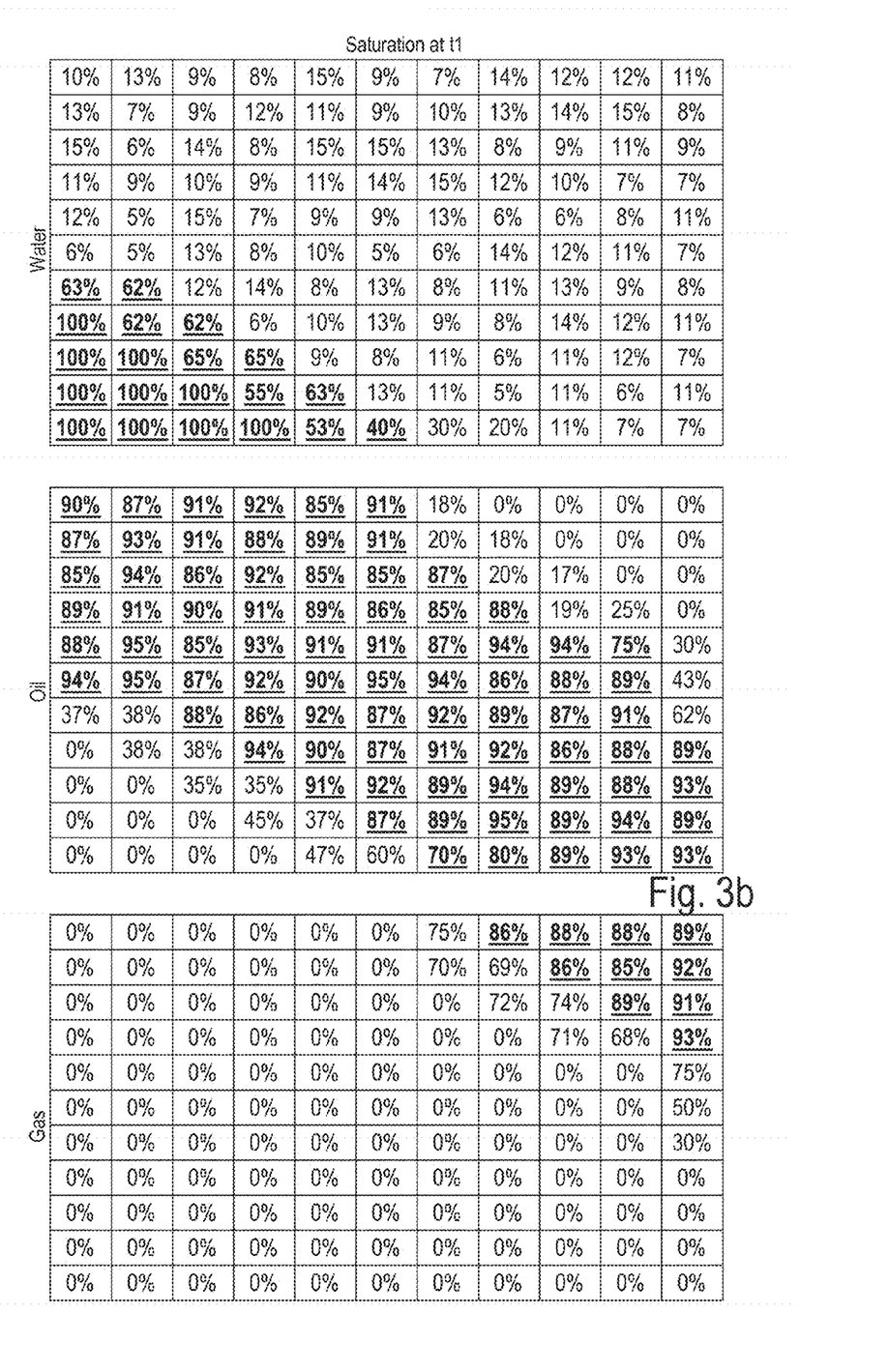

FIGS. 3a to 3f show example data at different stages of the methods described herein, for illustration. FIGS. 3a and 3b show the saturation values of water (top grid), oil (middle grid) and gas (bottom grid) for a number of cells; at a first time t0 and a second time t1 respectively. In this example, the initial front location threshold for water is 40%, for oil is 75% and for gas is 80%. The cells for which the saturation figure is highlighted bold and underlined are those which exceed the initial front location threshold for the fluid in question.

Figure 3C:
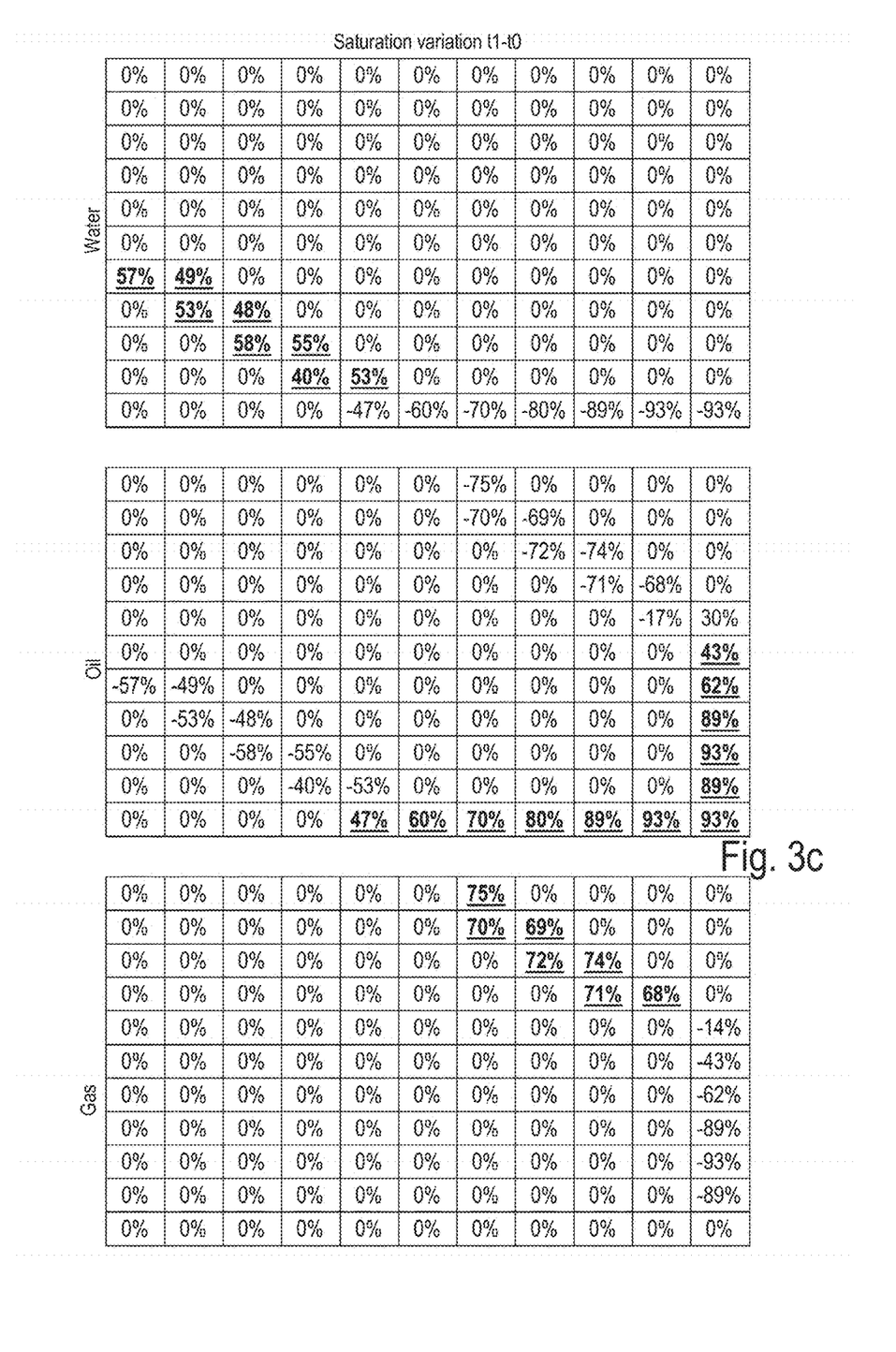
Figure 3D:
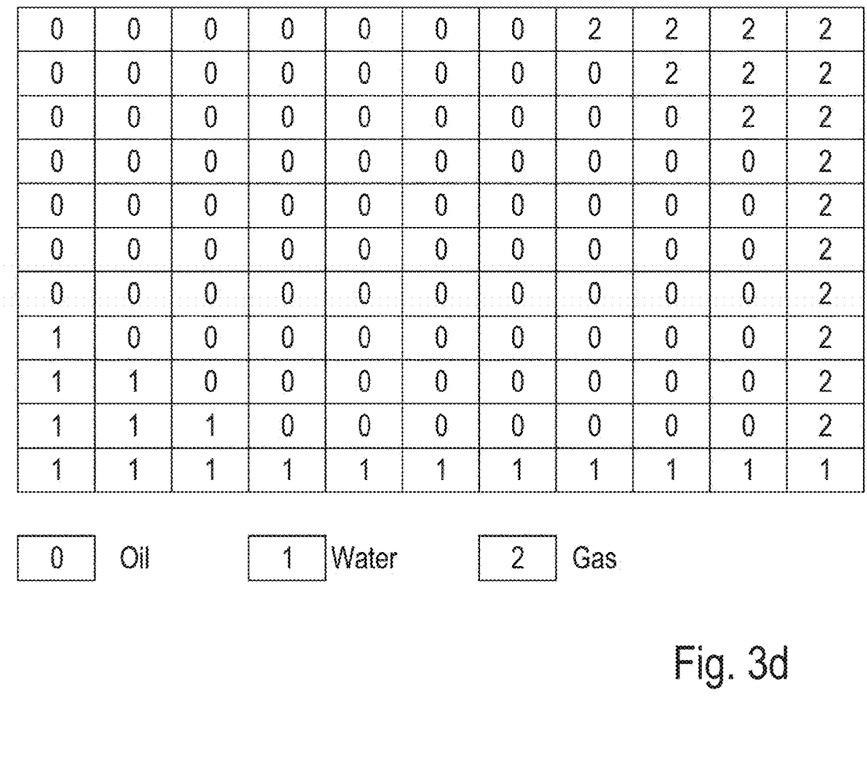

FIG. 3c shows the saturation changes between time t0 and time t1. In this example, the saturation change threshold for water is 20%, for oil is 30% and for gas is 35%. The cells for which the saturation change figure is highlighted bold and underlined are those which exceed the saturation change threshold for the fluid in question. FIG. 3d shows the initial phase zonation of oil (labelled 0), water (labelled 1) and gas (labelled 2) at time t0. FIGS. 3c and 3d represent the input data for the parameterization method.

Figure 3E:
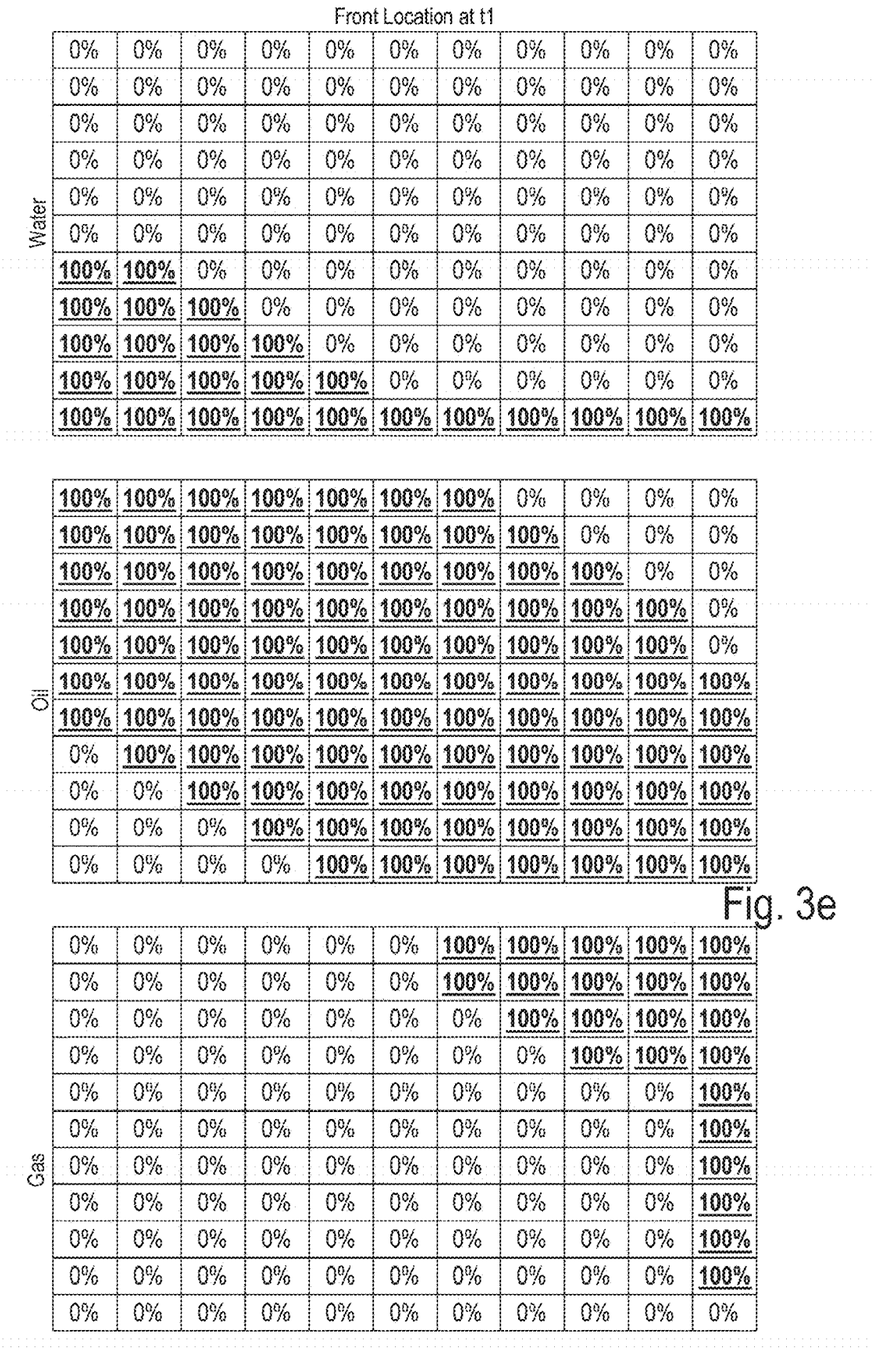

FIG. 3e shows the resultant front location parameters. This being an indicator parameter, each cell is at one of two states (here shown at 0% representing "before front" and 100% representing "behind front"). In each case, cells that are 100% are those where either the initial saturation exceeded the initial saturation threshold (those cells highlighted in FIG. 3a), or where the saturation variation exceeds the saturation variation threshold (those cells highlighted in FIG. 3c).

FIG. 3f shows the resultant sweep intensity parameters. Those highlighted correspond directly with the highlighted saturation variations of FIG. 3c. The remaining cells are attributed with an estimated average value, such as that calculated at step 215, of FIG. 2.

The method allows efficient and simultaneous representation of a first phase material invading the location originally filled with a second phase material, while this second phase material is invading another fraction of the reservoir filled by the original first phase material.

Using this approach, the data is factored into the inversion in a more suitable form. As a consequence, for the same solver iteration count:

Matched models' forecast 3D saturation changes coincide more with observations,
Modifications to the reservoir model are minimized.

The method enhances the efficiency of the overall inversion. But such efficiency is also dependent upon the efficiency of the solver process, the input parameter parameterization or parameterisation schemes relevant to other data types if included in the process. It is fundamentally a component of a broader process.

One or more steps of the methods and concepts described herein may be embodied in the form of computer readable instructions for running on suitable computer apparatus, or in the form of a computer system comprising at least a storage means for storing program instructions embodying the concepts described herein and a processing unit for performing the instructions. As is conventional, the storage means may comprise a computer memory (of any sort), and/or disk drive or similar. Such a computer system may also comprise a display unit and one or more input/output devices.

The concepts described herein find utility in all aspects of surveillance, monitoring, optimisation and prediction of hydrocarbon reservoir and well systems, and may aid in, and form part of, methods for extracting hydrocarbons from such hydrocarbon reservoir and well systems.

It should be appreciated that the above description is for illustration only and other embodiments and variations may be envisaged without departing from the spirit and scope of the invention. For example, while the method is described in terms of 3D models, it is applicable to 2D models.

The invention claimed is:

1. A method of monitoring changes in saturation of a subsurface volume, said method comprising:
   obtaining observed data of saturation behaviour from said subsurface volume over time;
   using at least one model, obtaining simulated data of saturation behaviour from said subsurface volume over time;
   transforming each of said observed data and said simulated data such that in each case the data is described in terms of:
   a front location parameter, wherein a cell of the subsurface volume is attributed a value according to its location relative to a front of a fluid for which saturation is being monitored, said front describing a boundary separating cells invaded by the fluid and cells not invaded by the fluid; and
   a sweep intensity parameter, wherein a cell of the subsurface volume is attributed a value according to either an observed saturation variation over a time period, or an estimated saturation variation over the time period;
   calculating a mismatch between saturation behaviour in said transformed observed data and saturation behaviour in said transformed simulated data over said time period;
   performing an inversion process so as to minimize the calculated mismatch as part of an iterative history matching technique, thereby obtaining a simulation data output that better corresponds to observed data; and
   using results of the inversion process to predict future saturation behaviour, thereby aiding hydrocarbon recovery from a reservoir.

2. The method as claimed in claim 1 wherein said front location parameter comprises a binary indicator parameter, the value attributed to a cell being dependent upon whether it is behind of said front or ahead of said front.

3. The method as claimed in claim 2 wherein a cell is determined to be behind said front if it has either a determined initial saturation level above a saturation threshold or a determined variation in saturation level above a saturation variation threshold; else it is determined to be ahead of said front.

4. The method as claimed in claim 3 comprising, for each phase being treated, selecting said saturation variation threshold which clearly separates clusters of cells not being invaded by the considered fluid from cells invaded by such fluid.

5. The method as claimed in claim 3 comprising, for each phase being treated, selecting said initial saturation threshold.

6. The method as claimed in claim 3 wherein, where a cell has a determined variation in saturation level above said saturation variation threshold, said sweep intensity parameter has the observed saturation variation for that cell attributed to it, and where a cell does not have a determined variation in saturation level above said saturation variation threshold, said sweep intensity parameter has attributed to it an estimated saturation variation expected for the considered fluid if the cell had been behind said front for the fluid being considered.

7. The method as claimed in claim 6 wherein said estimated saturation variation is derived from the average of observed or simulated saturation variations across some or all cells behind said front that are not within initial front location for the fluid being considered.

8. The method as claimed in claim 6 wherein said estimated saturation variation is estimated using an analytical model which allows estimating behind the front saturation as a function of rock and fluid properties.

9. A method as claimed in claim 1 wherein the sweep intensity parameter is a continuous variable parameter.

10. The method as claimed in claim 1 wherein the value of said estimated saturation variation is determined in an initial step.

11. The method as claimed in claim 1 comprising the step of running at least one simulation to obtain said simulated data.

12. A method as claimed in claim 1 wherein said method is performed as part of an iterative history matching technique comprising performing an inversion process so as to minimise the calculated mismatch.

13. The method as claimed in claim 12 wherein the step of calculating a mismatch comprises measuring the difference between corresponding observed and simulated front location parameters and measuring the difference between corresponding observed and simulated sweep intensity parameters.

14. The method as claimed in claim 13 wherein measuring the difference between corresponding observed and simulated sweep intensity parameters is performed on a cell by cell basis.

15. The method as claimed in claim 13 wherein measuring the difference between corresponding observed and simulated front location parameters comprises measuring each cell's distance to the front.

16. The method as claimed in claim 13, wherein the measured difference between corresponding observed and simulated front location parameters and measured difference between corresponding observed and simulated sweep intensity parameters are combined with a relative weight prior to said mismatch calculation.

17. The method as claimed in claim 12 wherein said history matching technique uses an ensemble Kalman filter technique.

18. The method as claimed in claim 1 wherein the transformation is performed for each fluid being considered.

19. The method as claimed in claim 18 wherein the transformation is performed for each fluid separately.

20. The method as claimed in claim 18 wherein the transformation is performed simultaneously for each fluid, or any subset of said fluids thereof.

21. The method as claimed in claim 1 further comprising the step of using the results of said method to aid hydrocarbon recovery from a reservoir.

22. A computer program product embodied on a non-transitory medium and comprising computer readable instructions which, when run on suitable computer apparatus, cause the computer apparatus to perform the method of claim 1.

* * * * *